June 26, 1962 G. W. KILLIAN 3,041,406

INWARD DIALING TO PRIVATE BRANCH EXCHANGE

Filed Dec. 14, 1959 7 Sheets-Sheet 1

INVENTOR.
GEORGE W. KILLIAN
BY
F. H. Henson
ATTORNEY

INWARD DIALING TO PRIVATE BRANCH EXCHANGE

Filed Dec. 14, 1959

7 Sheets-Sheet 2

June 26, 1962 G. W. KILLIAN 3,041,406

INWARD DIALING TO PRIVATE BRANCH EXCHANGE

Filed Dec. 14, 1959 7 Sheets-Sheet 4

June 26, 1962 G. W. KILLIAN 3,041,406

INWARD DIALING TO PRIVATE BRANCH EXCHANGE

Filed Dec. 14, 1959 7 Sheets-Sheet 6

3,041,406

INWARD DIALING TO PRIVATE BRANCH EXCHANGE

George W. Killian, Rochester, N.Y., assignor to General Dynamics Corporation, Rochester, N.Y., a corporation of Delaware Filed Dec. 14, 1959, Ser. No. 859,520
8 Claims. (Cl. 179—18)

This invention relates in general to automatic telephone systems and, more particularly, to automatic telephone systems for use in private branch exchanges.

Although the invention herein disclosed is suitable for more general application, it is particularly adapted for use in private branch exchanges which are arranged for inward dialing.

The advent of operator and subscriber toll dialing together with the speed and efficiency with which such calls are handled has made it desirable to permit subscribers and/or long distance operators to dial directly to specific stations with a PBX when the station number is known. Inward dialing service to PBX stations will increase the speed with which calls are completed and relieve the PBX operator of some of her duties thereby permitting her to give better and more complete service on the calls for which her services are required.

The telephone-using public is accustomed to being able to "flash" an operator in a PBX, by a slow hookswitch operation, for requesting a transfer of the connection, or other service. Naturally, with an inward dialed call, it will not be possible to flash an operator in the usual manner as her position and cord circuit were not involved in the completion of the call. This invention discloses a means for permitting a subscriber at a PBX extension to control the transfer of an inward dialed call to any other extension or to an operator as may be required by the exigencies of the situation.

It is the general object of this invention to provide a new and improved automatic telephone system.

It is a more particular object of this invention to provide a new and improved private branch exchange which provides a means for transferring inward dialed calls.

It is another object of this invention to provide a means for transferring inward dialed calls which is amenable to any number of transfers.

In accordance with the features of the present invention, a subscriber desiring to place a call to a particular PBX extension may dial all the necessary digits and, as the call is being set up, a selector in the central office, from which the PBX may be accessed, will seize a PBX selector through an adapter in the PBX. If the distances involved require it, a trunk circuit of any suitable type may be employed at both ends of the trunk line connecting the central office and the PBX. In the well known and entirely conventional manner, the selector in the PBX may be stepped to any desired level to seize a connector serving the desired group. In an equally well known and conventional manner, the connector may be stepped to any desired line and that line signaled. In response to answer supervision from the called line the adapter, which had previously presented a straight-through metallic path to the PBX selector, inserts a transmission bridge and forwards a signal to the connector causing it to switch through on a metallic basis thereby giving the answering extension direct metallic control of a relay in the adapter.

Should a transfer be required, the subscriber at the answering extension may affect it by dialing a predetermined code to cause the trunk line to be placed in a hold condition and to cause the adapter to close the loop to a predetermined line circuit thereby seizing it. In response to the seizure of the line circuit, a linefinder selector link is seized and dial controlled selective pulses may be sent to the selector and a connector to establish a connection to any other PBX extension. The transmission bridge for the connection just described between the two PBX extensions is included in the connector. If the second PBX extension is to take the trunk call, the first PBX extension may affect the complete transfer by the simple expedient of disconnecting which causes circuit means in the adapter to connect the trunk through a transmission bridge in the adapter to the second PBX extension and further causes the PBX connector to switch through on a metallic basis thereby providing, for the second PBX extension, the same control of the adapter that the first PBX extension had previously had. That is, the subscriber at the second PBX extension may transfer the call to any other PBX extension. Thus, a transfer of a call from an outside trunk line which was dialed to a particular PBX extension may be transferred to any other PBX extension under the control of the first PBX extension. When the transfer is completed, the connected PBX extension can control further transfers.

If a subscriber at a PBX extension to whom an inward dialed call was directed should attempt to transfer the call to another extension which should be busy, or fail to answer, the first PBX subscriber may reestablish the connection between himself and the trunk merely by making a slow hookswitch flash. Or, if the party to whom the first PBX party attempts to make the transfer should refuse to accept the call, the first PBX party may reestablish the connection between himself and the trunk line by making a slow hookswitch flash after the other PBX party has disconnected.

Transfers to the PBX operator may be made by dialing an appropriate code.

Further objects and advantages of this invention will become apparent as the following description proceeds, and features of novelty which characterize the invention will be pointed out in particularity in the claims annexed to and forming a part of this specification.

For a better understanding of the invention, reference may be had to the accompanying drawings which comprise 7 figures on 7 sheets.

Sheets 2–7 of the drawings should be arranged in successive order from left to right to show the invention.

Figure 1:
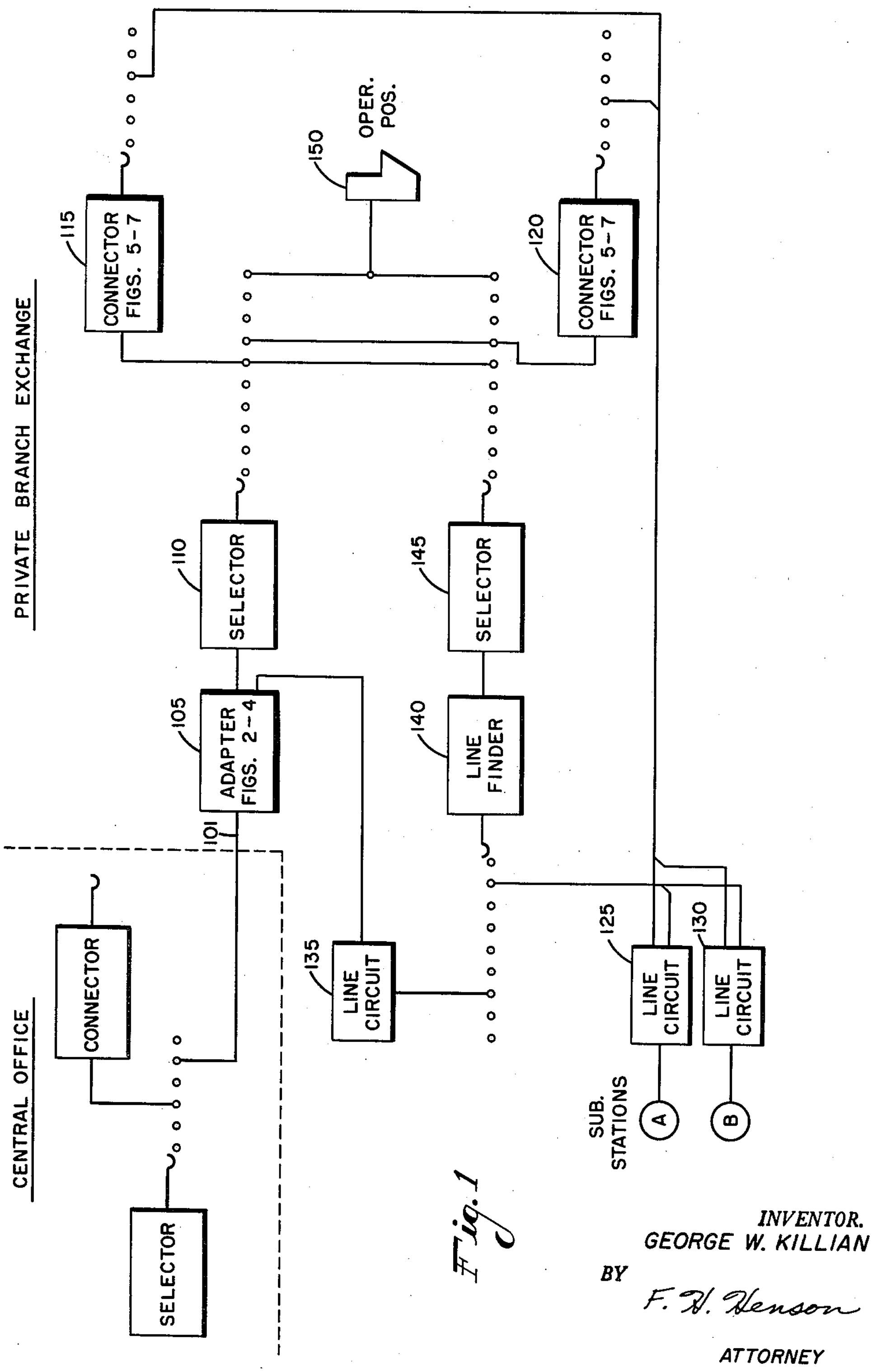
FIG. 1 shows a block diagram of a PBX incorporating this invention.
Figure 2:
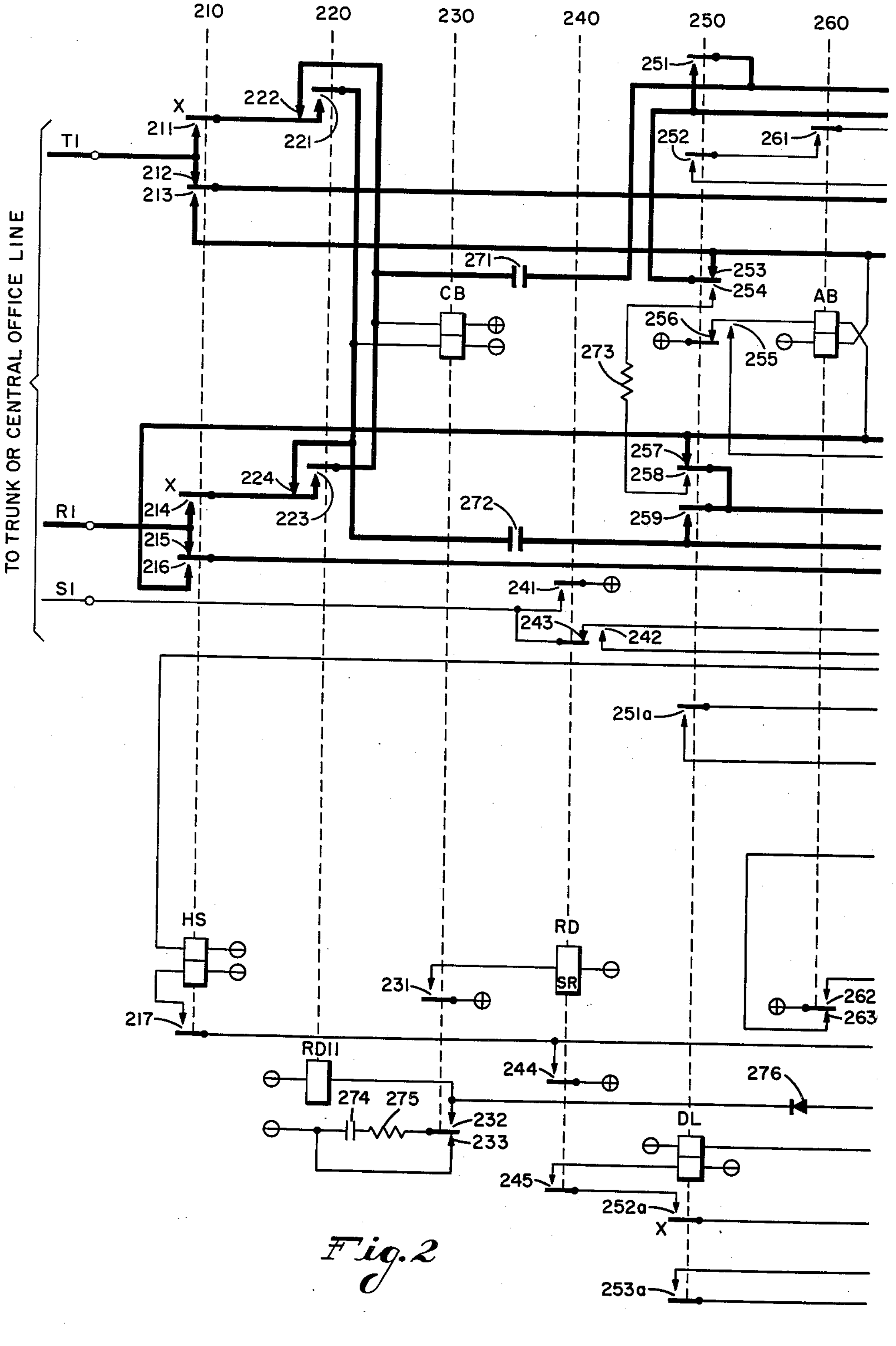
FIGS. 2–4 show the details of an adapter circuit.
Figure 3:
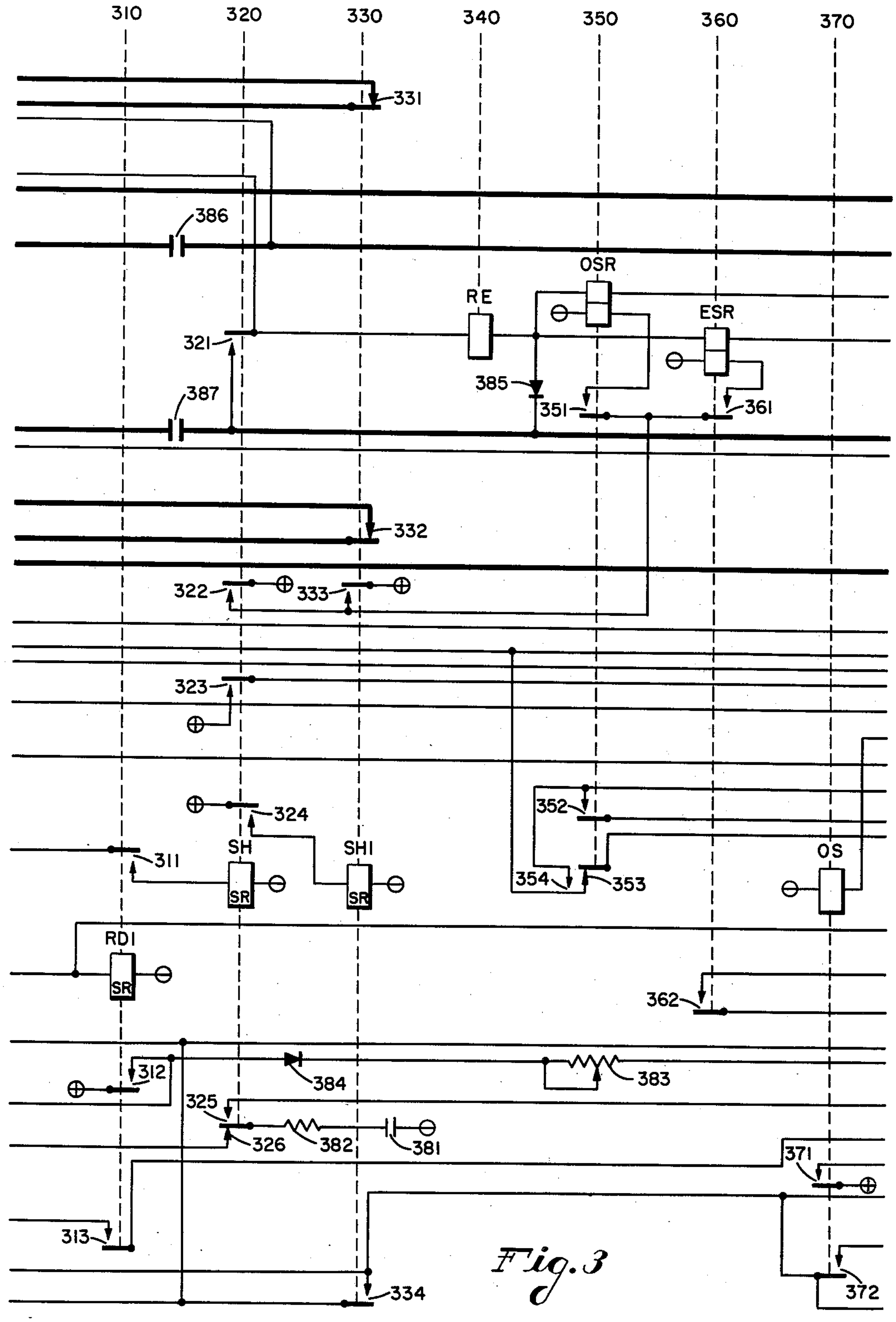
Figure 4:
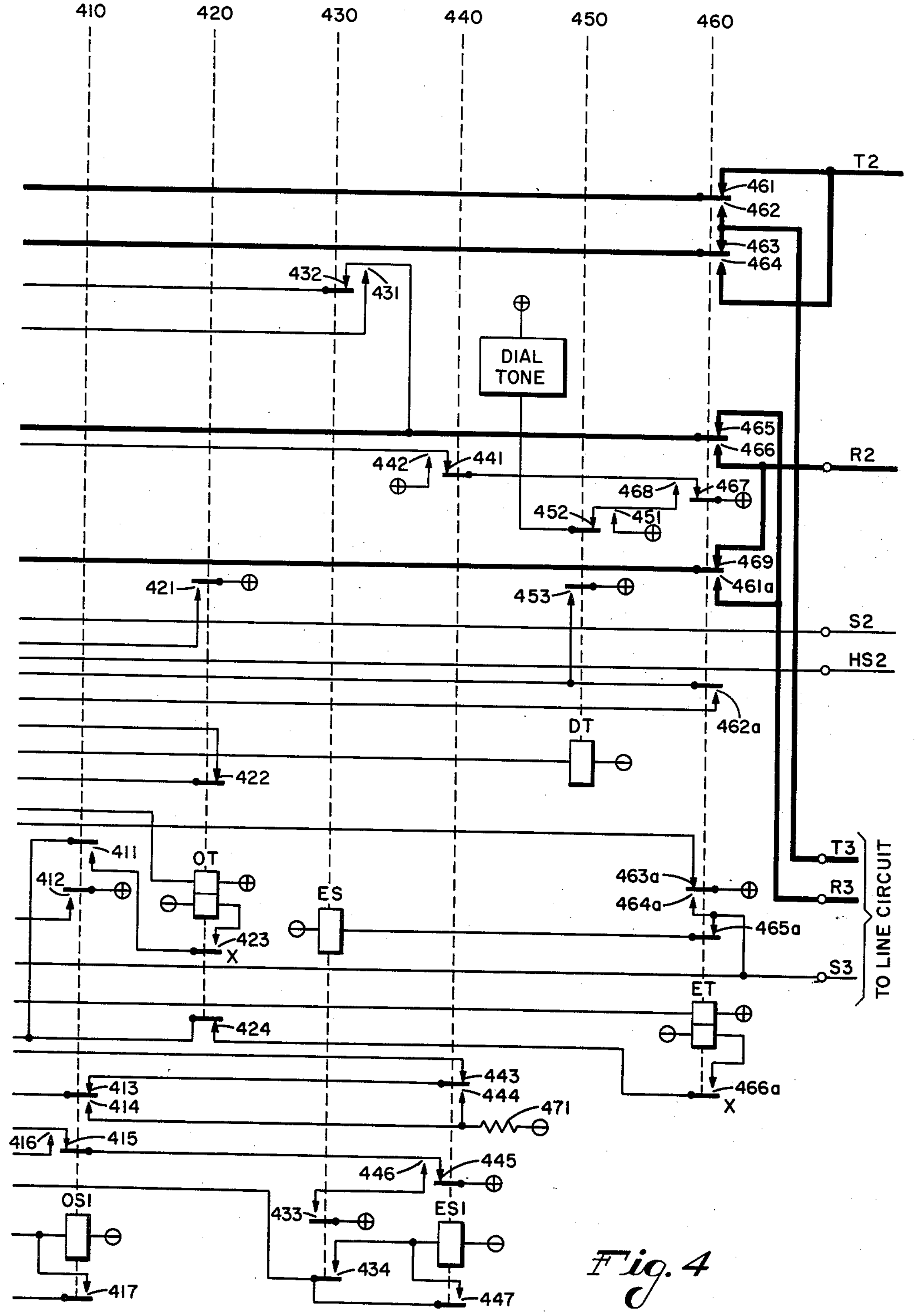

It is to be understood that only the details of the circuit necessary to understand the invention have been illustrated. For example, the details of circuits, such as line circuits, selectors and linefinders which are all well known in the art, have been omitted. In addition, as a convenience in simplifying the drawings, the power supply has not been shown and all terminals that are to be connected to the positive terminal of the power supply have been designated by the symbol (+) and in accordance with established terminonogy in the telephone art will hereinafter be referred to as "ground." In a similar manner, all terminals that are to be connected to the negative terminal of the power supply have been designated by the symbol (−) and in accordance with established telephone practice will hereinafter be referred to as "battery." Other standard and conventional terminology and symbols which are well known in the art are used throughout this specification.

It is believed that the operation of the system can best be understood by tracing the extension of a call through the system. For this purpose, reference may be had to FIG. 1 which illustrates in block diagram form some of the essential circuits which might be used in a PBX employing the present invention. A call which is incoming to the PBX will be received over line 101 which, if the distances between the central office and the PBX require it, will have included therein any suitable type of trunk circuit. The adapter 105 presents a straight-through metallic circuit to line 101 at the time of seizure. Therefore, the seizure of line 101 from the central office will cause selector 110 to be seized and condition it to respond to directive dial pulses from the central office. In response to the directive dial pulses, selector 110 will step and seize a connector, such as 115 or 120, in a manner well known in the telephone switching art. In response to additional directive pulses, the connector may be stepped to a terminal corresponding to a particular individual PBX extension and seize a line circuit, such as 125 or 130. Thus, a subscriber in the central office may dial the appropriate code and directory number of any desired PBX extension to establish a talking circuit between them. Or, if the party at the central office did not know the extension number of the desired PBX party, he could dial the directory number of the PBX and signal the PBX operator at position 150 and the operator could then extend and transfer calls in the standard manner.

For convenience of discussion, it will be assumed that a subscriber at the central office seized selector 110 through adapter 105 over trunk 101, and by dialing seized connector 115 and line circuit 125 to signal and talk with a party at station A. If it should develop that it is necessary for the central office party to talk to a different PBX party, for example one at station B, the party at station A may effect a transfer. Thereafter the party at station B may transfer the connection to any other PBX station. That is, the system is amenable to any number of transfers. The first station to be called by the central office party, A in the illustrated case, may be referred to as a first station while the station to which the call may be extended by transfer may be referred to as a second station. Subsequent transfers may be made to third, fourth, or fifth stations, etc. Also, as the description proceeds, it will be observed that adapter 105 has a certain group of relays operated when the central office party is talking to the first, third, fifth, etc. PBX station while a different group of relays are operated when the central office party is talking to the second, fourth, sixth, etc. PBX station. Therefore, this makes it convenient to refer to odd or even numbered stations and this terminology will be employed, too. That is, the station to which the call was first directed by dialing at the central office is an odd station while the station to which the call is next transferred is an even station.

When a call from the central office is dialed to a first station, such as station A, and station A answers, the connector 115 is caused to switch through on a metallic basis and a transmission bridge is inserted in adapter 105. Thus, station A has direct metallic control of an adapter relay. If the first party desires to transfer the call to a second party, he may do so by dialing a predetermined code, usually zero, which causes the adapter to hold the trunk line 101 and to seize line circuit 135. In response to the seizure of line circuit 135, the linefinder selector link 140, 145 is made operative in a well known manner and is associated with line circuit 135. In response to further dialing by the first party at station A, selector 145 may be caused to seize connector 120, and connector 120 may be stepped to seize and signal line circuit 130 and station B. When the second party answers, the first and second party talk through the following circuits: line circuit 125, connector 115, selector 110, adapter 105, line circuit 135, linefinder 140, selector 145, connector 120, and line circuit 130 to station B. Stations A and B may talk using a transmission bridge circuit in connector 120. Should the second party accept the call, a transmission path between the central office party and the second party will be established when the first party disconnects. In response to the disconnect of the first party, connector 120 will switch through on a metallic basis and a transmission bridge will be inserted in adapter 105. Thus, the second party will now have direct control of a relay in adapter 105 and if required the second party may effect a transfer to a subsequent party. In further response to the disconnect of the first party, selector 110 will restore to normal and connector 115 will be released. The first party is then free to make or receive any other calls.

Should the second party desire to transfer the call to a third party, he may do so by dialing the predetermined code which causes adapter 105 to hold the trunk line 101 and to reseize selector 110. In response to additional directive pulses from station B, selector 110 can be made to seize connector 115 and connector 115 can be dialed to the terminal corresponding to the third party. The second and third parties may then talk using the conventional transmission bridge circuit in connector 115. The transfer may be completed in a manner that is similar to the previously described transfer. That is, in response to the disconnect of station B, connector 115 will switch through on a metallic basis and a transmission bridge will be inserted in adapter 105. This restores the adapter to the condition it was in when the first party was connected to the central office line, and therefore, additional transfers may be completed as outlined above.

In the event that a transfer is attempted and the party to whom the call is being transferred does not desire to accept the call, the party making the transfer may reestablish a connection between himself and the party at the central office by making a slow hookswitch flash after the party to whom the call was to have been transferred has disconnected.

DETAILED DESCRIPTION

As has been discussed and as is illustrated in FIG. 1, a call from the central office will result in the seizure of selector 110 as adapter circuit 105 presents a straight-through metallic circuit. Selectors are so well known in the telephone switching art that the details thereof are not shown or described in this specification. Directive dialing will cause the selector 110 to seize connector 115 which is shown in greater detail in FIGS. 5, 6 and 7. Thus, when the connector is seized, the calling bridge relay 530 is operated from ground through the upper coil of relay 530, contacts 522, 511, selector 110, T2, contacts 461 and 212 to T1 and thence over the loop to R1, contacts 215, 468, R2, selector 110, R4, contacts 514 and 524 to the lower winding of relay 530 and battery.

The basic operation of connectors is so well known in the telephone switching art that only a brief explanation of the conventional operation of the connector will be given here.

The operation of the CB relay 530 closes contacts 531 to close a circuit to operate RD relay 610 from ground at contacts 731. Contacts 731 are physically associated with release magnet 730 of the two-motion step-by-step switch and do not operate unless release magnet 730 is energized. Contacts 612 of RD relay 610 place a ground on the S4 lead to hold a relay in selector 110 operated. Contacts 617 open a circuit to the release magnet 730 to prevent untimely operation thereof when the switch moves in the primary, or X, direction, and thereby closes the X off-normal contacts 741; or when the switch moves in the secondary, or Y direction, and thereby closes the Y off-normal contacts 751. The closure of contacts 613 by relay 610 provides a ground at a plurality of points. For convenience, this ground will hereafter be referred to as "master ground."

The X direction relay 620 is operated on its lower winding from master ground through X off-normal contacts 663. In a similar manner, the Y direction relay 630 is operated on its lower winding from master ground through Y off-normal contacts 542. The closure of contacts 625 serves to operate relay 710 from master ground through Y off-normal contacts 661 and contacts 625 to the coil of relay 710 and battery.

The CB relay pulses in response to the receipt of the dial pulses and thereby causes contacts 532 to pulse. Each time contacts 532 close, a circuit is completed therethrough and through contacts 615, 636 and 716 to the X stepping magnet 740. The upper winding of the XD relay 620 is connected in parallel with the X stepping magnet 740 through contacts 643. Through this circuit the X magnet 740 is energized and causes the switch to step a number of times corresponding to the digit dialed. The XD relay 620 and the RD relay 610 are maintained operated during this pulsing due to their slow release characteristics. At the end of the digit, the XD relay 620 is released and in turn relay 710 is released.

The next series of pulses cause the Y magnet to be energized over a circuit including contacts 715, 636 and 615 to pulsing contacts 532. In addition, the upper coil of the YD relay 630 is energized in parallel with the Y magnet 750 through contacts 638. As soon as the switch takes its first step in the Y direction, the XD relay 620 is reoperated on its lower winding through contacts 635 and by off-normal contacts 662 to master ground. At the end of the second series of pulses, the YD relay 630 releases.

At this time, the wiper S5 may encounter a ground on the terminal with which it is associated indicating a busy line or it may encounter a resistance battery indicating an idle line.

If a busy line is encountered, the ground connected to the S5 wiper will be conducted through contacts 631 and 625 to operate busy test relay 710. Thereafter relay 620 will release at the end of its slow release time closing contacts 624 before it opens contacts 625 thereby providing a holding circuit through contacts 717 and 634 and Y off-normal contacts 662 to master ground to hold relay 710 operated. Busy tone will be returned to the central office subscriber through contacts 622, 633, 713, 726, the upper winding of relay 520, capacitor 671 and contacts 522 and 511 to the tip side of the line. If this terminal is a terminal of a PBX group, the sleeve and HS wire bank will be strapped together and the busy marking ground on the sleeve will be conducted to wiper HS5 and thence through contacts 725, 632, 621, Y interrupter contacts 664, the hunt assist relay coil 640 and to battery through release magnet contacts 735. The operation of hunt assist relay 640 will close contacts 644 thereby providing a ground through closed contacts 626 and 637 to operate the Y magnet 750. In addition, master ground through Y off-normal contacts 662 and operated hunt assist relay contacts 642 is effective to hold XD relay 620 operated. Contacts 641 are effective to lock relay 640 operated under control of the Y interrupter contacts 664 which open in response to the operation of Y magnet 750. The operation of the Y magnet 750 is effective to move the wipers to the next terminal. If the next terminal is busy, as indicated by a ground on the terminal to which wiper S5 is now connected, the HS relay 640 will again be operated to cause the Y magnet to take an additional step. In this manner the switch will hunt until an idle line is found or until the end of the PBX hunting group is reached as indicated by the lack of a strap between the sleeve and HS terminals of the last line of a PBX group.

When wiper S5 is on a terminal associated with an idle line, a resistance battery will be conducted through contacts 631 and 623 to the upper winding of switchthrough relay 720 and thence through contacts 718 to ground at contacts 616. Relay 720 locks itself operated with master ground from the X or preliminary contacts 728 to the lower winding. The called station is signaled from generator through the upper winding of ring trip relay 650 through contacts 653, 722 and 516 to wiper R5 and the called line and thence back on wiper T5 through contacts 513, 721 and 651 to ground. Capacitor 673 and contacts 655 provided a circuit to return ringback tone to the calling party. When the called party answers, a loop is closed between T5 and R5 which serves to operate the ring trip relay 650 which locks itself operated to master ground from contacts 657. The answering loop across T5 and R5 is now effective to operate answer bridge relay 520 from ground at contacts 727 through the upper winding of relay 520, contacts 652, 721, and 513 to wiper T5 and thence over the loop and back on wiper R5 through contacts 516, 722, 654, 723, and 656 to the lower winding of relay 520 and battery. The AB relay 520 closes contacts 526 to provide an alternate source of master ground.

Contacts 525 of the AB relay place ground on the HS4 lead through selector 110 to operatae HS relay 210 in the adapter circuit. The operation of HS relay 210 transfers the loop from the calling station to connect it to CB relay 230 in the adapter rather than CB relay 530 in the connector. The circuit is from ground through the upper winding of relay 230, contacts 222 and 211 to T1 over the loop and back on R1 through contacts 214 and 224 to the lower winding of relay 230 and battery. Relay 230 closes contacts 231 to provide an obvious circuit to operate relay 240. The operation of HS relay 210 opened contacts 212 and 215 thereby opening the loop to CB relay 530 and, in response thereto, relay 530 releases. The closure of contacts 244 of relay 240 provides a holding ground through contacts 217 to hold relay 210. In addition, the operation of relay 240 places a ground from contacts 463*a* through contacts 353 and 242 forward on the sleeve lead to hold a relay operated in selector 110. This ground is also forwarded through selector 110 to sleeve lead S4 and through contacts 611 when relay 610 releases at the end of its slow release time and thence through contacts 711 and X off-normal contacts 541 to metallic-through relay 510 and battery at release magnet contacts 735. Prior to the operation of relay 240, the connector provided a ground on the S1 lead to the central office trunk circuit, when used, through contacts 243. After the operation of relay 240, contacts 241 thereof provide a ground to the central office trunk circuit.

As implied, relay 610 releases at the end of its slow release time in response to the release of relay 530. The release of relay 610 opens contacts 613 to remove one source of master ground. The operation of metallic-through relay 510 opens contacts 519 to prevent untimely operation of release magnet 730. The closure of contacts 517 replaces the ground that had been held on the sleeve wiper of the connector by contacts 724 to hold the cutoff relay of the called line circuit operated. In addition, the operation of metallic-through relay 510 switches through the T5 and R5 wipers of the connector from the called line to the adapter on a metallic basis by closing contacts 512 and 515. Switching through the answering loop as just described opens the circuit to relay 520 which releases. In response to the release of relay 520, contacts 526 open thereby removing master ground in the connector and releasing relays 650 and 720 which had been held by master ground. Thus, the only relay that remains operated in the connector is metallic-through relay 510. The called loop operates and holds the answer bridge relay 260 of the adapter from ground at contacts 256 through the upper winding of relay 260, closed contacts 216 and 469 to R2 and through selector 110 and thence through closed contacts 515 to the R5 wiper to the called loop and back to the T5 wiper and through contacts 512, selector 110, contacts 461 and 213 to the lower winding of relay 260 and battery. The operation of relay 260 closes contacts 262 to provide an obvious circuit to operate slow release relay 310. Contacts 312 of relay 310 close an obvious circuit to operate relay 220 which, by operation of contacts 221, 222, 223 and 224, provides reverse battery supervision to the central office.

The central office subscriber and the first PBX subscriber are now connected together on a talking basis with a transmission bridge including relays 230 and 260 which are capacitively coupled together through capacitors 271 and 272 and contacts 331, 253, 332, and 257.

The relays which are operated while the first party and the central office party are talking are HS relay 210, CB relay 230, RD relay 240, MT relay 510, AB relay 260, RD1 relay 310 and RD11 relay 220.

*Transfer from first party to second party.*—The relays which are operated while the first party is talking to the central office party are HS relay 210, CB relay 230 and RD relay 240, MT relay 510, AB relay 260, RD1 relay 310, and RD11 relay 220.

When the first party wants to effect a transfer, he will request that the central office party hold the line. The first party then dials a predetermined code, usually zero. In response to the dialed pulses, AB relay 260 will pulse and operate SH relay 320 on the first pulse from ground at contacts 263 through contacts 311 to SH relay 320. Contacts 324 of the SH relay operate the SH1 relay 330 over an obvious circuit. During the time that SH relay 320 is operated, capacitor 381 is charged from battery through capacitor 381, resistor 382, contacts 325, 413, and 443 through resistor 383 and diode 384 to ground at contacts 312. The greater the digit that is dialed, the longer relay 320 will be held operated and therefore the greater the charge on capacitor 381 will be. At the end of the digit, SH relay 320 releases thereby closing contacts 326 and connecting charged capacitor 381 in series with dial relay 250. The energy from capacitor 381 serves to operate the X or preliminary make contacts of dial relay 250 which then locks through the following circuit: from battery through the lower winding of dial relay 250, contacts 245, **252*a*, 313, 415, and 445 to ground. Operation of dial relay 250 opens contacts 253 and 257 and closes contacts 254 and 258 thereby splitting off, or disconnecting, the central office party from the local connection. Contacts 251, 254, 258, and 259 serve to connect resistor 273 to the central office line as an idle line termination. The closure of contacts 252 on dial relay 250 is operative to close a loop from T3 to R3 to seize line circuit 135. The circuit is from T3 through contacts 463, pulsing contacts 261, contacts 252, the retard coil 340, diode 385, and contacts 464 to R3. It should be noted that diode 385 shunts the upper winding of relay 350 when contacts 423 are closed and that the diode is effective to shunt the upper winding of relay 360 when contacts 431 are closed. In response to the seizure of line circuit 135, linefinder selector link 140, 145 will be seized and dial tone from selector 145 will be returned to the first party, who, in response thereto, will dial the appropriate digits to seize a connector and signal any desired second party. The connector that is seized is identical to the one shown in FIGS. 5, 6, and 7 and will respond as previously described. When the linefinder selector link became associated with line circuit 135, a ground was returned on sleeve lead S3 which operated the even sleeve relay 430 through contacts 465*a*. The closure of contacts 434 on ES relay 430 is operative to energize the ES1 relay 440 from battery through the winding of the ES1 relay, contacts 434, 253*a*, and 244 to ground. In response to each digit dialed by the first party, the AB relay 260 pulses and shunt relays 320 and 330 operate and release. Contacts 321 are effective to shunt the retard coil 340** during pulsing.

In response to the answer by the second party, AB relay 520 of the connector operates and contacts 521, 522, 523, and 524 return reverse battery supervision to the T3 and R3 wipers thereby operating the even supervisory relay 360 which had previously been shunted by diode 385.

The first and second parties may now talk using transmission bridge circuits in the adapter and the connector. The transmission bridge circuit in the adapter includes capacitors 386 and 387. If the second party accepts the call, the first party may complete the transfer by disconnecting, which causes AB relay 260 to release. In response to the release of relay 260, relays 320 and 330 will operate and CB relay 530 in the connector will be released as contacts 261 open the loop to it. The release of relay 530 opens the circuit to relay 610 which in turn releases at the end of its slow release time. The even talk relay 460 now operates from ground through its low resistance upper winding and contacts 362 to the S3 lead and through line circuit 135, linefinder 140, selector 145 to connector 120 and thence, as previously described, through contacts 611, 711, 541 through MT relay 510 in the connector associated with the second party and battery at contacts 735. The ET relay 460 locks itself operated from battery through its lower winding and the X or preliminary make contacts **466*a*, contacts 424 and 244 to ground. The operation of ET relay 460 opened contacts 463*a* thereby removing the ground which had held operated MT relay 510 in the connector associated with the first party thereby effecting the release of connector 115. The operation of ET relay 460 also opens contacts 465*a* which releases ES relay 430. When ES relay 430 operated and ES1 relay 440 operated, the holding circuit for DL relay 250 was shifted and was held by ground at contacts 433 through contacts 446, 415, 313, 252*a* and 245 to relay coil 250 and battery. Therefore, the release of ES relay 430 and the opening of contacts 433 causes DL relay 250** to release.

Connector 120 has now switched through on a metallic basis in response to the operation of MT relay 510 therein and thus the loop to the second party is connected directly across T3 and R3 and serves to operate AB relay 260 over the following circuit: from T3 through contacts 462 and 213 through the lower winding of AB to battery and from R3 through contacts **461*a* and 216 through the upper winding of AB relay 260 to ground at contacts 256. The operation of AB relay 260 re-operates the RD1 relay 310 if it had released. Contacts 312 of relay RD1 reestablishes a circuit to relay 220 which had not released as it was held operated from the energy stored in capacitor 274. Note that ground from contacts 312 had previously charged capacitor 274 through resistor 275, contacts 232 and diode 276. Contacts 233 are effective to discharge capacitor 274 when the circuit is released. Relays 320 and 330 will release if they had not done so previously. Relay 360, which had been locked through contacts 361 and 322 or 333, releases in response to the release of relay 330. Relay 440 which, through contacts 447, had locked itself operated independent of relay 440, releases in response to the release of relay 330 which opened contacts 334**.

The second party is now connected to the central office party through a transmission bridge in the adapter and the relays, which are now operated, are HS relay 210, CB relay 230, RD relay 240, ET relay 460, MT relay 510 in the connector associated with the second party, AB relay 260, RD1 relay 310, and RD11 relay 220.

*Attempted transfer from first to second party with first party reestablishing the connection to the central office party.*—The attempted transfer will function as described above but if the second party's line is busy then, since reverse battery supervision is not returned, the even supervisory relay 360 does not operate; or if the second party answers and declines to accept the call from the central office party, the second party disconnects thereby releasing ESR relay 360.

With the second party on-hook, the relays that are operated are relays 210, 230, 240, 510 in the connector associated with the first party, 260, 310, 220, 250, 430, 440 and the following relays in the connector associated with the second party 530, 610, 720 and 650.

The first party may reestablish a connection between himself and the central office party by a slow hookswitch operation. In response to the hookswitch flash, relay 260 will release thereby opening the loop to the connector associated with the second party which therefore releases. Note that ET relay 460 does not operate at this time as ESR relay 360 is not operated and therefore contacts 362 are open. In response to the closure of contacts 263 on relay 260, relays 320 and 330 will operate. However, capacitor 381 will not be charged as relay 440 is operated thereby closing contacts 444 and connecting resistor 471, which is battery-connected, in series with capacitor 381 which is also battery-connected. Relay 310 releases at the end of its slow release time and relay 610 in the connector associated with the second party releases at the end of its slow release time. Contacts 313 of relay 310 open the circuit to relay 250 which releases. Relay 430 releases in response to the release of relay 610 which removed the sleeve ground that had been holding relay 430. Relays 320 and 330 release at the end of their slow release time in response, respectively, to the opening of contacts 311 and 324. Relay 440 releases in response to the release of relay 330 which opened contacts 334. Relay 220 is held operated from the energy that had been stored in capacitor 274. Relay 260 reoperates at the end of the hookswitch flash and in response thereto relay 310 reoperates.

The relays which are now operated are 210, 230, 240, 510, 220, 260, and 310. It will be noted that these are the same relays that were operated before the transfer was attempted and therefore the first party is again connected on a transmission basis to the central office party and by repeating the procedure described above, the first party may attempt a transfer to any other PBX station.

*Transfer from even to odd party.*—The relays operated while an even party is talking to the central office party are HS relay 210, CB relay 230, RD relay 240, ET relay 460, MT relay 510 in the connector associated with the even party, AB relay 260, RD1 relay 310 and RD11 relay 220.

The transfer proceeds in the same general manner when the even party transfers a call to an odd party, as that described hereinbefore wherein an odd party transferred a call to an even party. However, when an even party transfers to an odd party, incoming selector 110 which has no dial tone is used. Therefore dial tone must be artificially applied for the sake of uniform operation.

To initiate the transfer, the even party will dial the digit zero. In response to the first release of AB relay 260, SH relay 320 will operate and as previously described contacts 325 thereof close a circuit to charge capacitor 381. Relay 330 operates. At the end of the pulsing of this digit, the SH relay releases and the energy stored on capacitor 381 again serves to operate dial relay 250 which, as previously described, locks itself operated on its lower winding. The operation of relay 250 splits off the central office party. The DL relay 250 closes a loop to seize incoming selector 110 from T2 through contacts 464, pulsing contacts 261, contacts 252, the retard coil 340, diode 385 and contacts 466 to R2. Dial tone is returned to the even party from the grounded dial tone source through contacts 452, 468, 441, and 255 to the upper winding of relay 260 and thence to the even party's line. In response to each dialed digit, the SH and SH1 relays 320 and 330 will operate at the start of each digit and will release at the end of each digit. In response to the closure of contacts 323, as the first digit is dialed, ground will be forwarded therefrom through contacts 462a and 251a to dial tone relay 450. The opening of contacts 452 on relay 450 is effective to remove dial tone and contacts 451 provide a ground to hold relay 260. At other times, relay 260 may be held from ground at contacts 256 or 442 or 467. The closure of contacts 453 on relay 450 serve to hold relay 450 operated independent of relay 320.

When the odd party answers, odd supervisory relay 350 will operate from the reverse battery supervision returned by relay 520 in the connector associated with the odd party. Odd sleeve relay 370 operates from battery through the relay and contacts 422, 354, and 242 to the ground returned on the sleeve lead from contacts 612 in the even connector. In response to the operation of relay 370, relay 410 operates from battery through the relay contacts 372, 253a, and 244 to ground. Contacts 417 of relay 410 serve to hold relay 410 operated independent of relay 370. Contacts 412 of relay 410 hold relay 310 operated independent of relay 260.

The even and odd parties may now talk using transmission bridge circuits in the adapter and the odd connector. The relays operated are 210, 230, 240, 460, and relay 510 in the even connector, relays 260, 310, 220, 250, 450, 350, 370, and 410 plus relays 530, 610, 720, 650, and 520 in the odd connector.

If the odd party is willing to accept the central office call offered to him by the even party, the even party may effect the final transfer by the simple expedient of disconnecting which releases relay 260. The release of relay 260 is effective to operate relay 320 and in its turn relay 330, either of which may provide a ground through contacts 322 and 333 to hold relay 350. The release of relay 260 also opens the loop to the odd connector thereby releasing relay 530 and in response thereto relay 610 releases at the end of its slow release time. Odd talk relay 420 operates from ground through its low resistance upper winding and contacts 352, 354, and 242 to the back sleeve lead of the odd connector and through contacts 611, 711, 541, relay 510 and contacts 735 to battery. This circuit serves to operate the metallic-through relay 510 in the connector. Relay 420 locks itself operated from battery through its lower winding and its X, or preliminary, make contacts 423 and contacts 411 and 244 to ground. In response to the opening of contacts 424 of relay 420, relay 460 releases. The opening of contacts 422 of relay 420 is effective to release relay 370. The closure of contacts 421 places a direct ground on the sleeve lead to the connector. When relay 370 operated followed by the subsequent operation of relay 410, the holding circuit of relay 250 was shifted so that it was held from ground at contacts 371 through contacts 416, 313, 252a, and 245 to the lower winding of relay 250. Therefore, the release of relay 370 and the opening of contacts 371 is effective to release relay 250. In response to the release of relay 250, contacts 251a thereof open and effect the release of relay 450.

The odd party's answering loop is effective to operate relay 260 since the odd connector has now switch through on a metallic basis. In response to the reoperation of relay 260, relay 320 will be open circuited and it will release at the end of its slow release time. Note that relay 310 had not released as its was held operated by contacts 412 of relay 410. Relay 330 will release in response to the release of relay 320. Relay 410 releases responsive to the opening of contacts 253a and 334. The opening of contacts 411 on relay 410 releases relay 420. Relay 350 releases responsive to the release of relay 330. The release of relay 460 opens contacts 464a thereby releasing the metallic-through relay 510 in the connector associated with the even party. In response to the release of relay 510, the even connector restores to normal as previously described.

The relays which are operated while an odd party and the central office party are talking are HS relay 210, CB relay 230, RD relay 240, RD11 relay 220, MT relay 510 in the odd connector, AB relay 260, and RD1 relay 310. It may be observed that these are the same relays that were operated when an even party was talking to the central office party except that even talk relay 460 is not operated and the MT relay that is operated is, of course, in the odd connector rather than in the even connector.

If the odd party should decline to accept the call, the even party may reestablish a connection to the central office by a slow hookswitch flash which will cause the circuits to function in a manner similar to that previously described when an even party declined to accept the call and the odd party reestablished a connection to the central office party by a hookswitch flash. That is, with odd supervisory relay 350 released, the hookswitch flash releases the odd connector and reestablishes the circuit as it had been, when the even party and the central office party were talking, by releasing dial relay 250. The operation is so similar to that previously described that it is believed that the detailed description need not be repeated.

Figure 5:
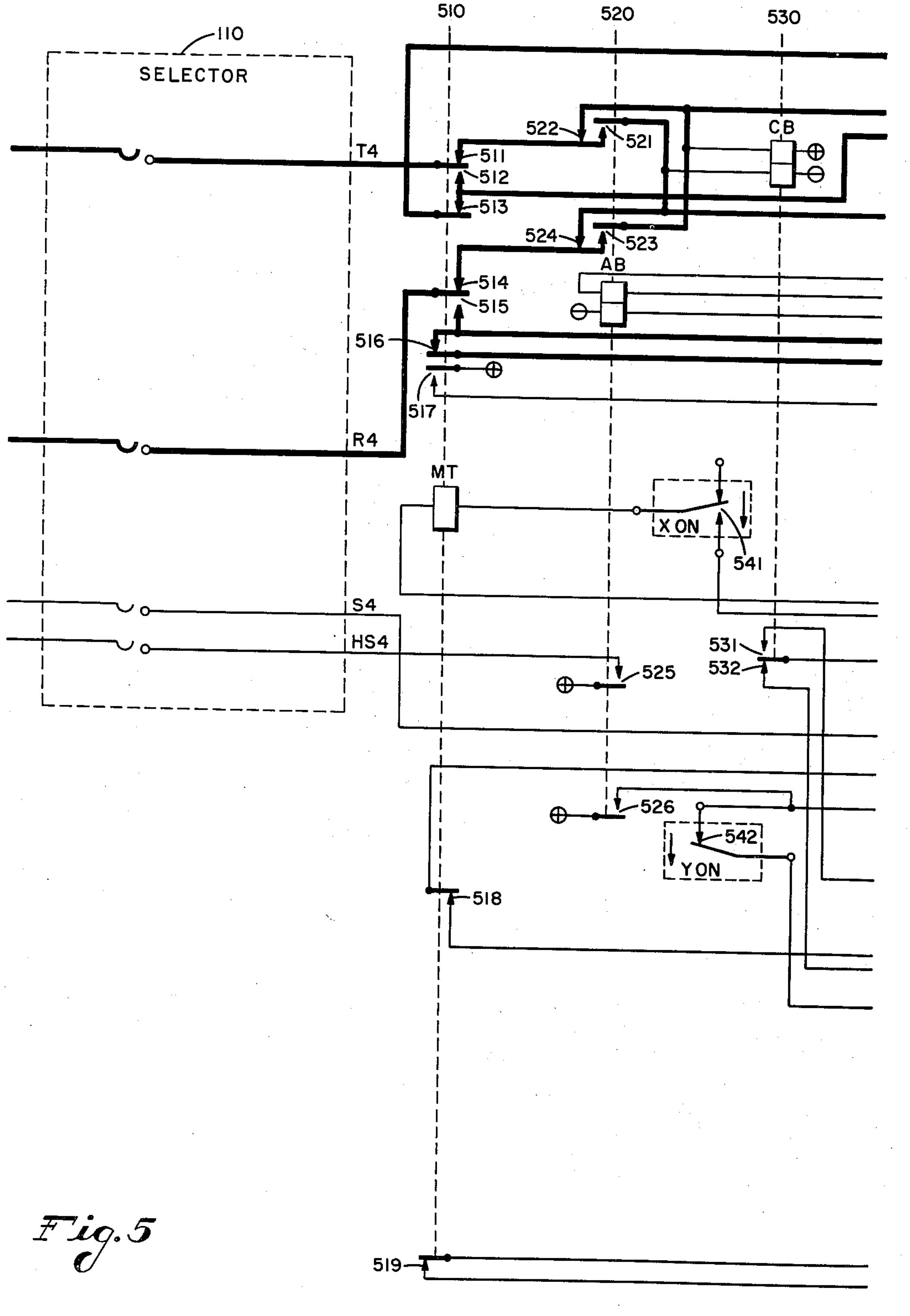
FIGS. 5–7 show the details of a modified connector circuit.
Figure 6:
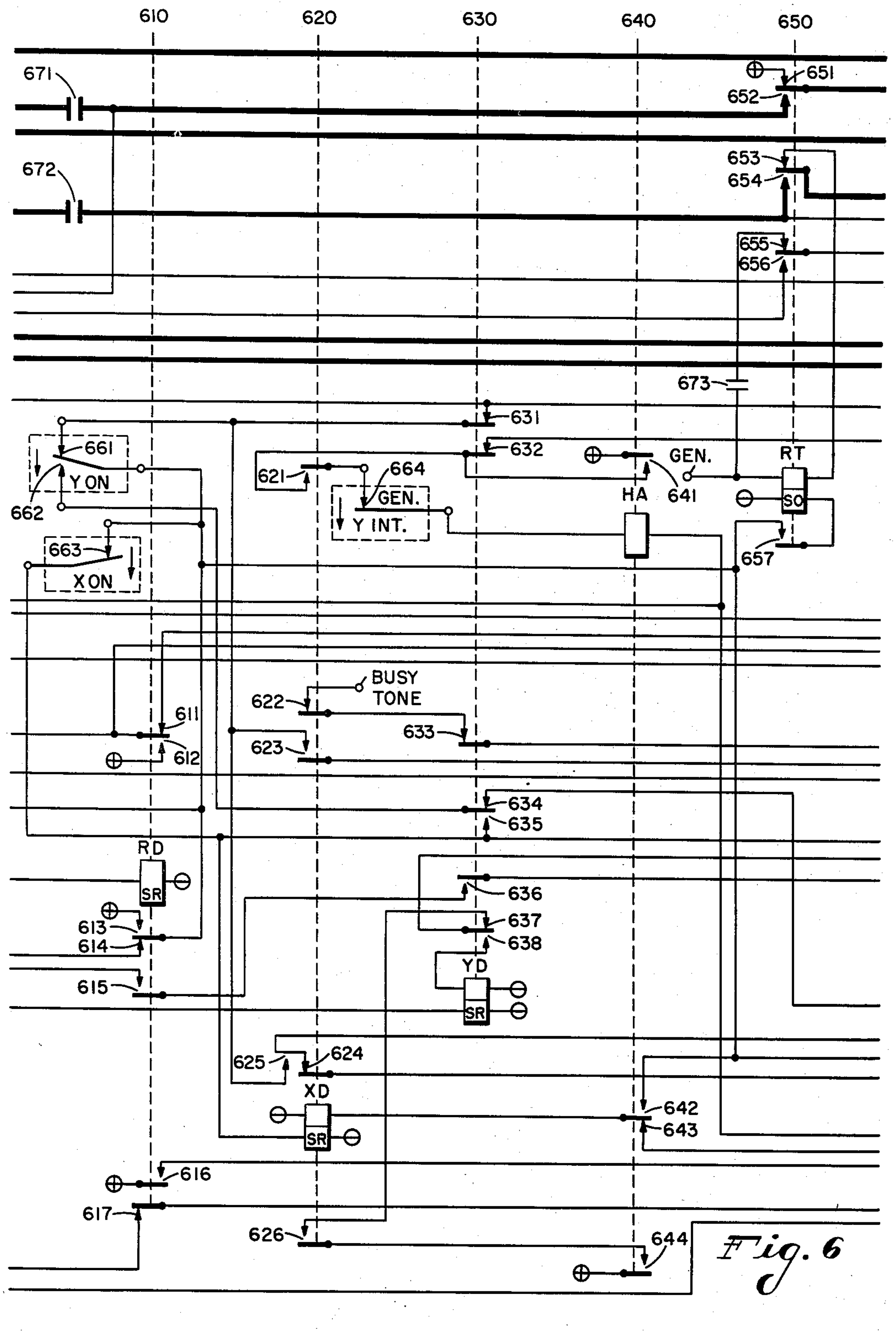
Figure 7:
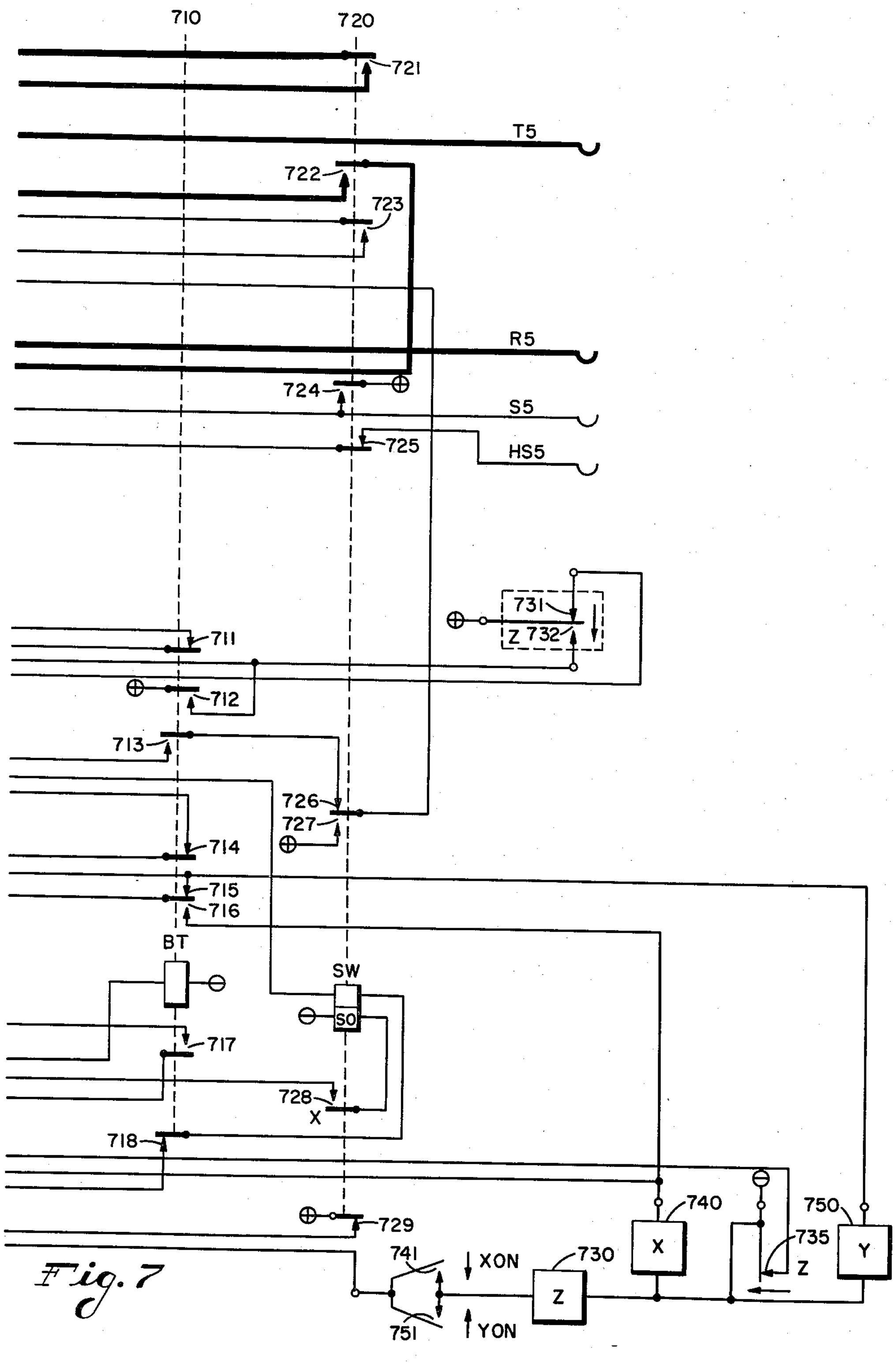

*Miscellaneous connector features.*—The connector shown in FIGS. 5, 6, and 7 is arranged with a feature known as last party release, which means that the connector will not be released until the last party releases irrespective of whether the last party to release is the calling or the called party. Thus, when the connector is used for routine PBX calls from one party to another party, the relays that are operated during conversation are relays 530, 610, 720, 650, and 520. If the calling party releases first, relay 530 releases and in response thereto relay 610 releases at the end of its slow release time. Relay 620 reoperates from battery through the lower winding, contacts 714, 518, 614 to ground and to the alternate source of master ground at contacts 526. The BT relay 710 reoperates from battery through the winding of relay 710, contacts 625, 631 and 724 to ground. Contacts 712 are effective to apply a ground to the S4 lead to mark this circuit as busy until the called party has disconnected. When the called party does release, relay 520 releases thereby releasing contacts 526 which had furnished master ground to hold all the other relays. When relay 720 releases, contacts 729 close to establish a circuit through contacts 617 and 519 and either X off-normal contacts 741 or Y off-normal contacts 754 to release magnet 730. In response to the operation of release magnet 730, contacts 732 close to apply a ground to the back sleeve to continue to mark this circuit as busy until the switch has restored to its home position and thereby opened contacts 741 and 751 to deenergize release magnet 730.

Capacitors 671 and 672 are part of the connector transmission bridge circuit.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a telephone system, a PBX, a plurality of extensions each connected with said PBX by a two-conductor loop, an outside trunk line terminating at said PBX, means including automatic switching circuits for establishing a first transmission connection from said outside trunk line to a first selected one of said extensions, means responsive to the dialing of a predetermined code and other directive pulses at said first selected extension for disconnecting said first transmission connection and establishing an independent transmission connection between said first selected extension and a second selected extension, and means responsive to a disconnect signal from the first selected extension for establishing a second transmission connection between said trunk line and said second selected extension.

2. The system as set forth in claim 1 and including an adapter circuit in said PBX for terminating said outside trunk line, wherein the transmission bridge circuit for said first and second transmission connection is included in said adapter, and the transmission bridge circuit for said independent transmission connection is included in said automatic switching circuits.

3. In a telephone system, a PBX, a plurality of extensions each connected with said PBX by a two-conductor loop, an outside trunk line terminating at said PBX, means including automatic switching circuits for establishing a first trunk transmission connection from said outside trunk line to a first selected one of said extensions, means responsive to the dialing of a predetermined code and other directive pulses at said first selected extension for disconnecting said first trunk transmission connection and establishing a first independent transmission connection between said first selected extension and a second selected extension, means responsive to a disconnect signal from the first selected extension for establishing a second trunk transmission connection between said trunk line and said second selected extension, means responsive to the dialing of the same predetermined code and other directive pulses at said second selected extension for disconnecting said second trunk transmission connection and establishing a second independent transmission connection between said second selected extension and any other extension, and means responsive to a disconnect signal from the second selected extension for establishing a third trunk transmission connection between said trunk line and said other extension.

4. The system as set forth in claim 3 wherein only the transmission bridge circuit for said first and second independent transmission connections is included in said automatic switching circuits.

5. The system as set forth in claim 4 and including an adapter circuit in said PBX for terminating said outside trunk line, said adapter circuit having a transmission bridge circuit for completing only said first, second, and third trunk transmission connections.

6. In a telephone system, a PBX, a plurality of extensions each connected with said PBX by a two-conductor loop, an outside trunk line terminating at said PBX, means including automatic switches for establishing a first trunk transmission connection from said outside line to a first selected one of said extensions, means responsive to the dialing of a predetermined code and other directive pulses at said first selected extension for disconnecting said first trunk transmission connection and establishing a first independent transmission connection between said first selected extension and a second selected extension, means responsive to a disconnect signal from the first selected extension for establishing a second trunk transmission connection between said trunk line and said second selected extension when said second selected extension is offhook, and means responsive to a hookswitch flash at the first selected extension for reestablishing said first trunk transmission connection when said second selected station is onhook.

7. In a telephone system, a PBX having a plurality of extensions each connected with said PBX by a two-conductor loop, an outside line terminating at said PBX in an adapter circuit having a plurality of relays, means in said PBX responsive to the seizure of said outside line from a central office for seizing a first connector, means including said first connector for extending a first transmission connection to a first one of said extensions in response to directive pulses from said outside line, switching circuits including line circuits, line finders and other connectors in said PBX for completing local transmission connections between said extensions, means responsive to the dialing of a predetermined code at said first extension for disconnecting said first transmission connection and for seizing a predetermined one of said line circuits, means responsive to further dialing of directive pulses at said first selected extension for extending local transmission connection through said predetermined line circuit, a line finder and one of said other connectors to a second selected extension with a transmission bridge circuit in said other connector, means responsive to a disconnect signal from said first selected extension for connecting said outside line and said second selected extension in a second transmission circuit with a talking bridge in said adapter circuit, and means further responsive to a disconnect signal from said first selected extension for causing said other connector to switch through on a metallic basis whereby said second selected extension is directly connected to the transmission bridge circuit in the adapter and said first connector and said first selected extension are released.

8. The system as set forth in claim 7 and including means controlled by directive pulses from said second selected extension for disconnecting said second transmission circuit and for reseizing said first connector and extending a second independent transmission connection to another extension through said first connector with a transmission bridge circuit in said first connector, means responsive to a disconnect signal from said second selected extension for connecting said outside line and said other extension together through a transmission bridge circuit in said adapter circuit, and means further responsive to said disconnect signal from said second selected extension for causing said first connector to switch through on a metallic basis whereby said other extension is directly connected to the transmission bridge circuit in the adapter and said other connector and said second selected extension are released.

References Cited in the file of this patent

UNITED STATES PATENTS

| | | |
|---|---|---|
| Re. 17,526 | Jacobsen | Dec. 17, 1929 |
| 1,441,791 | Friendly | Jan. 9, 1923 |
| 1,464,118 | Stokley | Aug. 7, 1923 |
| 1,597,032 | Gardner | Aug. 24, 1926 |
| 1,627,929 | Richardson | May 10, 1927 |
| 1,627,930 | Richardson | May 10, 1927 |
| 1,670,252 | Gardner | May 15, 1928 |
| 1,721,748 | Richardson et al. | July 23, 1929 |
| 1,888,337 | Voss | Nov. 22, 1932 |